United States Patent [19]

Watson et al.

[11] Patent Number: 4,564,529

[45] Date of Patent: Jan. 14, 1986

[54] DRY MIX FOR WHIPPED TOPPINGS

[75] Inventors: Francis L. Watson, Ocean Gate; Stevan A. Angalet, Jackson; Richard A. Carlson, Freehold, all of N.J.

[73] Assignee: General Foods Corporation, White Plains, N.Y.

[21] Appl. No.: 485,777

[22] Filed: Apr. 18, 1983

[51] Int. Cl.⁴ .................. A23G 3/00; A23L 1/22; A23L 1/19

[52] U.S. Cl. ................. 426/570; 426/548; 426/572; 426/654

[58] Field of Search ............. 426/564, 570, 572, 548

[56] References Cited

U.S. PATENT DOCUMENTS

| | | | |
|---|---|---|---|
| 2,846,314 | 8/1958 | Aichele et al. | 426/570 |
| 2,868,653 | 1/1959 | Diamond et al. | 426/570 |
| 2,913,342 | 11/1959 | Cameron et al. | 99/123 |
| 3,246,992 | 4/1966 | Noznick et al. | 99/139 |
| 3,295,986 | 1/1967 | Saslaw et al. | 99/123 |
| 3,330,667 | 7/1967 | Tressler | 99/139 |
| 3,407,076 | 10/1968 | Ganz | 426/570 |
| 3,479,190 | 11/1969 | Ganz | 426/570 |
| 4,311,717 | 1/1982 | McGinley | 426/330.3 |
| 4,451,492 | 5/1984 | Dell et al. | 426/570 |

*Primary Examiner*—Jeanette M. Hunter
*Attorney, Agent, or Firm*—Thomas R. Savoie; Barbara T. D'Avanzo; Daniel J. Donovan

[57] ABSTRACT

A dry mix for making a whipped topping when combined with cold milk or water is produced by dry blending a spray dried, encapsulated fat, a sweetener and particles of a hydroxypropyl cellulose gum. The prepared topping has excellent texture, an absence of off-flavors and a relatively low level of the hydrocolloids stabilizers.

10 Claims, No Drawings

DRY MIX FOR WHIPPED TOPPINGS

TECHNICAL FIELD

The present invention relates to a powdered product which can be reconstituted with an aqueous fluid, such as water and/or milk, and whipped into a light foam which is suitable for use as a whipped topping. It is desirable for such a powdered product to possess a high degree of shelf-stability such that even after prolonged storage of twelve months or more, the product will whip to a foam having a high degree of overrun. The whipped foam should also possess good stability and be free of off-flavors.

Present, commercially-available powdered whipped topping mixes are known to consist of a dry blend of sucrose, a flow agent and a spray dried fat component. This spray dried fat component has heretofore contained fully and/or partially hydrogenated vegetable oils along with emulsifying agents, encapsulating agents, whipping agents and stabilizing agents. Various examples of these classes of materials are well-known in the art of powdered topping compositions as exemplified by U.S. Pat. No. 3,246,992 to Noznick et al. and 3,330,667 to Tressler each of which is hereby incorporated by reference. Dietetic, powdered whipped topping mixes have also been prepared which are free of sucrose and contain a heat-stable intensive sweetener such as saccharin as an ingredient of the spray dried fat component.

Prior to the present invention, a preferred encapsulated, spray dried fat for formulating a sucrose-containing powdered whipped topping mix, suitable for being combined with milk and mixed with a home-type mixer, consisted essentially of: hyrogenated vegetable oil; carbohydrate encapsulating agents including sucrose and corn syrup solids; protein encapsulating/whipping agents including sodium and/or calcium caseinate, and whey solids; emulsifying agents including hydroxylated soybean lecithin, propylene glycol monostearate and acetylated monoglycerides; and hydrocolloid stabilizers including hydroxypropyl cellulose, microcrystalline cellulose and sodium carboxymethyl cellulose. A combination of these stabilizers was believed to be critical for the production of a powdered topping mix which would, even after several months of shelf storage, yield a desirable high overrun in excess of 220%. Experience has shown that over time there is a gradual loss in the amount of overrun that can be obtained from a given topping mix.

DISCLOSURE OF THE INVENTION

Previous powdered whipped topping mixes have included a relatively high level of multiple stabilizers as ingredients in a spray dried fat component and have been found to produce whipped topping which contain a perceptible off-flavor. This high level of stabilizers was found to be necessary in order to obtain the more than 220% overrun required for a whipped topping after prolonged storage of the dry mix. It has now been found that a relatively low level of hydroxypropyl cellulose gums is effective as the sole stabilizing agents for a powdered whipped topping mix when included in the mix as a dry ingredient. The utilization of hydroxypropyl cellulose gums as dry ingredients, as opposed to being part of the spray dry fat composition, has also been found to eliminate the presence of off-tastes in the whipped topping and further results in a product which possesses a more desirable mouthfeel and texture. It is speculated that the passage of hydroxypropyl cellulose gum stabilizers through a spray drying operation, where it is exposed to high temperature and pressure, both decreases the functionality of the gum and imparts an off-flavor which is detectable in the resulting whipped topping. As used in this invention, the term hydroxypropyl cellulose gums is meant to include hydroxypropyl cellulose, hydroxypropyl methylcellulose, and the like.

The use of hydroxypropyl cellulose gums as dry ingredients in a powdered whipped topping mix has not previously been thought to be practical because of the slow rate of hydration of these materials. Since powdered topping mixes are intended for reconstitution in the home with cold milk or water, rapid hydration of all of the ingredients is critical. It has consequently been the prior art practice to incorporate the stabilizers into a spray dried fraction, such as a spray dried fat, so that hydration of the stabilizers is effected at elevated temperatures prior to spray drying.

According to this invention the dry topping mix will have a level of hydroxypropyl cellulose gum, as a dry ingredient, which is less than 2.5% by weight of the fat contained in the product. Preferably this level will be from 0.6% to 2.0% by weight of the fat and the mix will be essentially free of other hydrocolloid stabilizers. It is, however, within the scope of this invention to include minor amounts of stabilizers other than hydroxypropyl cellulose gums in the mix, such as part of the spray dried fat component.

For sugar-sweetened products, sugar, spray dried fat and the dry gum will typically be combined, such as by dry blending, to comprise the final product. In the case of sugar-free products, an intensive, heat-stable sweetener could be incorporated in the spray dried fat component as is the current practice. Alternatively, the intensive sweetener could be included in the final product as a dry ingredient. This latter technique would be dictated when a heat-sensitive sweetener, such as the dipeptide sweetener known as aspartame, is being employed.

EXAMPLE 1

Two whipped topping mixes were prepared in order to compare a prior art formulation (A) to a comparable formulation which utilizes the instant invention (B)

| Ingredient | Formula A (Wt. %) | Formula B (Wt %) |
|---|---|---|
| Spray Dried Fat | 62.54 | 53.13 |
| Hydrogenated Vegetable Oil | (21.89) | (18.59) |
| Carbohydrate Encapsulants | (22.28) | (19.65) |
| Chemical Emulsifiers | (10.01) | (8.50) |
| Protein Encapsulants | (6.88) | (5.85) |
| Hydroxylated Soybean Lecithin | (0.63) | (0.53) |
| Hydroxypropyl Cellulose | (0.38) | — |
| Microcrystalline Cellulose | (0.23) | — |
| Sodium Carboxymethyl Cellulose | (0.02) | |
| Flavor | (0.21) | — |
| Color | (0.01) | (0.01) |
| Sucrose | 36.33 | 45.22 |

-continued

| Ingredient | Formula A (Wt. %) | Formula B (Wt %) |
|---|---|---|
| Sodium Silicoaluminate | 1.13 | 0.96 |
| Flavor/Color | — | 0.48 |
| Hydroxypropyl Cellulose | — | 0.21 |

35.5 grams of Formula A and 41.8 grams of Formula B were each blended with one-half cup of cold milk and one-half teaspoon of vanilla extract. Mixing was effected by whipping at high speed with a hand held electric mixer for four minutes. In both instances an acceptable topping was produced which had a measured overrun of about 250%. The viscosity values for the whipped toppings were measured as 33 centipoise (cp.) for Formula B and 38 cp. for Formula A. On tasting, the whip of Formula B was found to be preferred due to the presence of a metallic off-flavor and a less desirable texture in the Formula A whip. The high overrun is achieved in the case of Formula B with a reduction in the level of stabilizers in excess of about 60% by weight. Formula A had a stabilizer level of 2.9% by weight of the vegetable oil, whereas the comparable level for Formula B was 1.1%.

EXAMPLE 2

A series of experiments were conducted wherein 22.22 grams of the spray dried fat of Example 1, Formula B was mixed with 18.91 grams of sucrose and varying levels (between 0 and 0.13 grams) and types of stabilizers. The resulting powders were mixed with one-half cup of milk with a hand mixer rotating at 330 RPM for 30 seconds and then 850 RPM for 4 minutes. The average overrun and viscosity reading of four separate samples was obtained and is set forth in Table 1. An increase in viscosity with increasing levels of the stabilizer would indicate hydration of the stabilizer under the test conditions.

TABLE 1

| Stabilizer | Grams Added | Overrun (%) | Viscosity (cp.) |
|---|---|---|---|
| Hydroxypropyl | 0 | 230 | 22 |
|  | 0.05 | 240 | 26 |
|  | 0.07 | 242 | 31 |
|  | 0.09 | 257 | 30 |
|  | 0.11 | 246 | 31 |
|  | 0.13 | 273 | 34 |
| Gum Arabic | 0 | 236 | 25 |
|  | 0.05 | 224 | 23 |
|  | 0.07 | 229 | 27 |
|  | 0.09 | 232 | 25 |
|  | 0.11 | 225 | 25 |
|  | 0.13 | 236 | 26 |
| Gum Guar | 0 | 238 | 25 |
|  | 0.05 | 223 | 27 |
|  | 0.07 | 219 | 28 |
|  | 0.09 | 216 | 30 |
|  | 0.11 | 219 | 31 |
|  | 0.13 | 219 | 31 |
| Hydroxypropyl methylcellulose | 0 | 238 | 19 |
|  | 0.05 | 259 | 24 |
|  | 0.07 | 253 | 26 |
|  | 0.09 | 269 | 31 |
|  | 0.11 | 274 | 33 |
|  | 0.13 | 279 | 33 |
| Sodium Carboxymethyl Cellulose (high-viscosity) | 0 | 227 | 25 |
|  | 0.05 | 220 | 25 |
|  | 0.07 | 220 | 26 |
|  | 0.09 | 217 | 25 |
|  | 0.11 | 219 | 27 |
|  | 0.13 | 235 | 22 |
| Sodium carboxymethyl Cellulose (low-Viscosity) | 0 | 249 | 22 |
|  | 0.05 | 249 | 21 |
|  | 0.07 | 250 | 22 |
|  | 0.09 | 248 | 24 |
|  | 0.11 | 250 | 25 |
|  | 0.13 | 249 | 26 |
| locust bean gum | 0 | 258 | 25 |
|  | 0.05 | 248 | 26 |
|  | 0.07 | 240 | 26 |
|  | 0.09 | 229 | 24 |
|  | 0.11 | 230 | 25 |
|  | 0.13 | 235 | 27 |
| xanthan gum | 0 | 242 | 28 |
|  | 0.05 | 221 | 31 |
|  | 0.07 | 219 | 34 |
|  | 0.09 | 214 | 30 |
|  | 0.11 | 212 | 34 |
|  | 0.13 | 209 | 33 |
| kappa carrageenan | 0 | 241 | 25 |
|  | 0.05 | 236 | 26 |
|  | 0.07 | 232 | 27 |
|  | 0.09 | 239 | 29 |
|  | 0.11 | 228 | 25 |
|  | 0.13 | 235 | 28 |
| propylene glycol alginate | 0 | 242 | 26 |
|  | 0.05 | 229 | 24 |
|  | 0.07 | 229 | 24 |
|  | 0.09 | 228 | 23 |
|  | 0.11 | 230 | 28 |
|  | 0.13 | 226 | 28 |
| algin | 0 | 251 | 22 |
|  | 0.05 | 240 | 24 |
|  | 0.07 | 238 | 25 |
|  | 0.09 | 236 | 25 |
|  | 0.11 | 223 | 23 |
|  | 0.13 | 232 | 26 |
| microcrystalline cellulose (92%) and sodium carboxy methyl cellulose (8%) | 0 | 242 | 22 |
|  | 0.05 | 237 | 23 |
|  | 0.07 | 243 | 22 |
|  | 0.09 | 243 | 22 |
|  | 0.11 | 241 | 23 |
|  | 0.13 | 240 | 23 |

As can be seen for the data of Table 1, hydroxypropyl cellulose and hydroxypropyl methyl cellulose are the only stabilizers that effect an increase in overrun and are thus the only suitable stabilizers for use in this invention.

A high overrun is needed in order to insure the production of a whipped topping which will be acceptable. At an overrun below about 220% a foamed emulsion will be too heavy to be perceived as a topping. Desirably, at zero storage time, the dry mix should be capable of producing a topping which has an overrun substantially in excess of 220%. This initial high overrun is needed since a decrease in obtainable overrun will occur over time. A high level of stabilizers as part of the spray dried fat components has previously been used to effect high overruns; however, this results in increased raw material costs and a less desirable texture in the topping. The instant invention obtains increased functionality from hydroxypropyl cellulose gum stabilizers by employing the gums as dry ingredients. In this manner high product overrun can be achieved without adverse texture effects and with reduced raw material costs.

Having thus described the invention what is claimed is:

1. A dry mix which is able to be combined with cold water or milk and whipped into a stable, foamed topping comprising a dry blend of (1) an encapsulated, spray dried fat component and (2) a hydrocolloid stabilizer comprising unhydrated hydroxypropyl cellulose, and wherein the encapsulated fat component includes fat, carbohydrate encapsulating agents, proteinaceous encapsulating agents and emulsifying agents.

2. The dry mix of claim 1 wherein the encapsulated fat component is essentially free of hydrocolloid stabilizers.

3. The dry mix of claim 1 wherein the level of hydroxypropyl cellulose totals less than 2.5% by weight of the fat contained in the dry mix.

4. The dry mix of claim 1 wherein hydroxypropyl cellulose is essentially the only hydrocolloid stabilizer contained in the mix.

5. The dry mix of claim 1 wherein the hydroxypropyl cellulose is hydroxypropyl cellulose and/or hydroxypropyl methyl cellulose.

6. The dry mix of claim 1 wherein the level of hydroxypropyl cellulose is from 0.6% to 2.0% by weight of the fat contained in the dry mix.

7. The dry mix of claim 1 wherein a sweetener is a component of the dry blend.

8. The dry mix of claim 7 wherein the sweetener is sucrose.

9. The dry mix of claim 7 wherein the sweetener is aspartame.

10. The dry mix of claim 1 wherein the dry-blended hydrocolloid stabilizer consists essentially of unhydrated hydroxypropyl cellulose.

* * * * *